(12) United States Patent
Cabioch et al.

(10) Patent No.: US 7,470,743 B2
(45) Date of Patent: Dec. 30, 2008

(54) RUBBER COMPOUND FOR TIRE TREAD AND METHOD FOR THE PREPARATION THEREOF

(75) Inventors: Jean-Luc Cabioch, Chateaugay (FR); Laurent Coissieux, Clermont-Ferrand (FR); Jean-Michel Favrot, Cournon d'Auvergne (FR); Franck Varagniat, Ceyrat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/183,912

(22) Filed: Jul. 19, 2005

(65) Prior Publication Data

US 2006/0009568 A1    Jan. 12, 2006

Related U.S. Application Data

(63) Continuation of application No. PCT/EP04/00280, filed on Jan. 16, 2004.

(30) Foreign Application Priority Data

Jan. 20, 2003    (FR) .................................. 03 00743

(51) Int. Cl.
*C08G 61/08* (2006.01)
(52) U.S. Cl. ......................... 524/553; 524/554; 524/571
(58) Field of Classification Search ................. 524/525, 524/553, 554, 571
See application file for complete search history.

(56) References Cited

U.S. PATENT DOCUMENTS 3,966,691 A    6/1976    Halasa 5,906,956 A    5/1999    Halasa et al.

FOREIGN PATENT DOCUMENTS

EP    1423442 A    6/2004
WO    03/008470 A    1/2003

OTHER PUBLICATIONS

Luxton et al., "Observations on the preparation of polybutadiene containing vinyl cyclopentane units," *Polymer*, Mar. 1981, pp. 382-386, vol. 22, IPC Business Press, Oxford, GB.

*Primary Examiner*—Peter D Mulcahy
(74) *Attorney, Agent, or Firm*—Buchanan Ingersoll & Rooney PC

(57) ABSTRACT

A crosslinkable or crosslinked rubber composition is described which includes a diene elastomer having a mass content of cyclic vinyl units of greater than 15%, and which may be used to form a tire tread. Also described is a tire tread and a tire incorporating the tread. The composition contains a linear or branched diene elastomer derived from at least one conjugated diene, and a reinforcing filler. The elastomer has cyclic vinyl units according to a mass content of greater than or equal to 15% and a number-average molecular weight of from 30,000 to 350,000 g/mol. The elastomer may be obtained by anionic polymerization of one or more monomers including a conjugated diene in an inert hydrocarbon solvent with a catalytic system including an organolithium initiator and a polar agent with several heteroatoms. The reaction may be performed batchwise where the polar agent:initiator molar ratio is greater than 8, or continuously where the polar agent:initiator molar ratio is greater than or equal to 3.

16 Claims, No Drawings

RUBBER COMPOUND FOR TIRE TREAD AND METHOD FOR THE PREPARATION THEREOF

CROSS-REFERENCE TO RELATED APPLICATIONS

The present application is a continuation of PCT Application No. PCT/EP2004/000280, filed Jan. 16, 2004, published in French on Aug. 5, 2004 as WO 2004/065478, which claims priority of French Application No. 03/00743, filed Jan. 20, 2003, the contents of both applications being incorporated herein in their entirety.

BACKGROUND

1. Field of the Invention

The present invention relates to a crosslinkable or crosslinked rubber composition which comprises a diene elastomer having a mass content of cyclic vinyl units of greater than 15%, and which may be used to form a tire tread. The invention also relates to such a tread and to such a tire incorporating said tread.

2. Description of Related Art

A conjugated diene monomer, such as butadiene, may be incorporated into a polymer obtained anionically in the form cis-1,4, trans-1,4 or -1,2 (vinyl linkages).

Anionic polymerization reactions are conventionally initiated by an organolithium compound in the presence of a hydrocarbon solvent and one or more conjugated diene monomers. The elastomers produced by these reactions have a low average mass content of vinyl linkages, generally being between 8% and 15%. In order to obtain elastomers having a given glass transition temperature (Tg), it is known to add to the polymerization medium a polar agent, which also has the effect of significantly increasing the average content of these linkages. This content may then reach 90%, for example.

US patent specifications U.S. Pat. Nos. 5,620,939, 5,906,956 and 6,140,434 disclose anionic polymerization processes which are performed batchwise, are intended to increase the content of vinyl linkages in a diene elastomer which may be a polybutadiene, a styrene-butadiene copolymer or a polyisoprene. Furthermore, these documents indicate that the diene elastomers so obtained are usable in rubber compositions for tire treads, whether associated with carbon black or with silica. These batch polymerization processes are carried out at a temperature of between 30 and 100° C. and they in particular involve the use of catalytic systems comprising:

a polar agent comprising one or more heteroatoms, such as tetrahydrofuran (THF) or tetramethylethylenediamine (TMEDA), an organolithium initiator, such as n-butyllithium, and an alkali metal salt of an aliphatic or alicyclic alcohol, such as sodium tert.-amylate or sodium mentholate.

More precisely, in its Examples, document U.S. Pat. No. 5,620,939 discloses molar ratios of [(salt:initiator), (salt:polar agent), (polar agent:initiator)] which are equal to [1; 0.33; 3], [2; 0.66; 3], [3; 1; 3], [0.5; 0.17; 3], [1; 0.5; 2] and [1; 0.2; 5].

In its Examples, document U.S. Pat. No. 5,906,956 discloses the following values for said molar ratios: [2; 1; 2], [0.5; 1; 0.5], [0.25; 0.08; 3], [0.5; 0.17; 3], [1; 0.33; 3], [1; 0.66; 3], [3; 1; 3], [0.5; 0.17; 3], [1; 0.5; 2] and [1; 0.2; 5].

In its Examples, document U.S. Pat. No. 6,140,434 discloses the following values for said molar ratios: [0.25; 0.03; 8], [0.25; 0.05; 5], [0.25; 0.08; 3], [0.25; 0.25; 1], [0.25; 0.5; 0.5], [0.15; 0.05; 3], [0.5; 0.17; 3], [1; 0.33; 3] and [0.25; 0.13; 2].

Independently of raising the content of vinyl linkages in these elastomers, the attempt has in the past been made to form cyclic structures of the vinylcyclopentane type in diene elastomers obtained anionically.

One solution for forming these cyclic structures involves performing post-polymerization reactions, for example by treating the elastomers with Lewis acids.

Another solution may involve forming these cyclic structures directly during anionic polymerization by performing said polymerization continuously with a low monomer concentration in the reaction medium and using a specific catalytic system.

In its examples of embodiment, US patent specification U.S. Pat. No. 3,966,691 describes a process for cyclizing butadiene in the polymerization medium, which involves using a catalytic system comprising an initiator consisting of n-butylsodium and an activator consisting of tetramethylethylenediamine (TMEDA). A lithium alkoxide is optionally added to the polymerization medium to accelerate polymerization.

Polymerization is performed continuously at a temperature of between −20° C. and 150° C., and the polybutadienes obtained have a mass content of cyclic structures of greater than 40%, but a number-average molecular weight of no more than 2,000 g/mol.

The articles "G. Quack, L. J. Fetters, Macromolecules, Vol 11, no. 2, pp. 369-373, (1978)" and "A. R. Luxton, M. E. Burrage, G. Quack, L. J. Fetters, Polymer, Vol 22, pp. 382-386" also describe continuous cyclization processes in the polymerization medium, which involve using catalytic systems comprising an organolithium initiator, such as n-butyllithium, and a polar agent consisting of TMEDA (reference may be made to page 383, right hand column of the last-cited document for a description of the cyclization mechanism).

The polymerizations are performed at temperatures of between 30 and 90° C. and the polybutadienes obtained have a mass content of vinylcyclopentane cycles of at least 18%, but a number-average molecular weight of no more than 5,000 g/mol.

One major drawback of these polymerization processes is thus the very low value of the number-average molecular weight of the diene elastomers obtained, which means that these elastomers cannot be used to form the elastomeric matrix of a rubber tire tread composition.

SUMMARY OF THE INVENTION

The object of the present invention is to overcome this drawback, and said object is achieved in that the applicants have surprisingly discovered that linear or branched diene elastomers arising from at least one conjugated diene and comprising both cyclic vinyl units in a mass content of greater than or equal to 15% and a number-average molecular weight of from 30,000 to 350,000 g/mol, may advantageously be used, thanks to their relatively high molecular weight and their elevated content of cyclic vinyl units, to form all or part of the elastomeric matrix of a crosslinkable or crosslinked rubber composition which may be used to form a tire tread and which in particular furthermore comprises a reinforcing filler.

The applicants have in fact just unexpectedly discovered that tire tread type compositions based on these elastomers with a high cyclic vinyl unit content have in particular, in the crosslinked state, hysteresis losses and moduli of elongation which are entirely of the same order as those exhibited by known tread compositions based on diene elastomers containing no cyclic vinyl units, these latter compositions otherwise being identical.

DETAILED DESCRIPTION OF THE INVENTION

Advantageously, the rubber composition according to the invention is such that the elastomer with cyclic vinyl units which it comprises has a number-average molecular weight of from 60,000 to 350,000 g/mol and, even more advantageously, of from 100,000 to 300,000 g/mol.

According to an advantageous example of embodiment of the invention, the rubber composition according to the invention is such that said elastomer has a mass content of cyclic vinyl units of greater than or equal to 20%.

The cyclic vinyl units of said elastomer according to the invention are of the vinylcycloalkane type, and they are of the following generic formula:

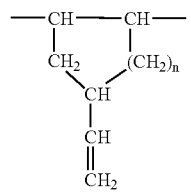

where n=1 or 2.

The diene elastomer of the composition according to the invention preferably comprises a mass fraction of units derived from conjugated dienes which is greater than 30% and may be any homopolymer or copolymer obtained by polymerization:
- of a conjugated diene monomer having from 4 to 12 carbon atoms or of two or more of these conjugated diene monomers together, or alternatively
- of one or more of these conjugated diene monomers with one or more vinyl aromatic compounds each having from 8 to 20 carbon atoms.

Suitable conjugated diene monomers are, in particular, 1,3-butadiene, 2-methyl-1,3-butadiene, 2,3—di-(C1 to -C5 alkyl)-1,3-butadienes such as 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, for example, styrene, ortho-, meta- and para-methylstyrene, the commercial mixture "vinyltoluene", para-tert.-butylstyrene or divinylbenzene. It will be noted that styrene is preferably used.

Preferably, in the process according to the invention, 1,3-butadiene and/or isoprene are used as the conjugated diene monomer(s), while styrene is used as the vinyl aromatic monomer in order to obtain copolymers of butadiene/isoprene (BIR), styrene/butadiene (SBR), styrene/isoprene (SIR) or butadiene/styrene/isoprene (SBIR).

Even more preferably, said elastomer consists of a homopolymer of 1,3-butadiene (BR) or a copolymer of 1,3-butadiene and a vinyl aromatic comonomer.

In this latter case, 1,3-butadiene and styrene may be copolymerized to obtain an SBR having at least 70% by weight of butadiene and at most 30% by weight of styrene and, preferably, at least 90% of butadiene and at most 10% of styrene.

In this preferred case where the elastomer comprising cyclic vinyl units is a BR or an SBR, it will be noted that this elastomer may advantageously have a zero or low content of styrene (as is the case for BR and SBR, respectively), a monomer which is relatively expensive in comparison with butadiene, so consequently giving rise to a reduced overall cost for obtaining the composition according to the invention, while still imparting to said composition substantially the same properties in the crosslinked stake (hysteresis losses, moduli and glass transition temperature) as those imparted by a known SBR with a higher styrene content, thanks to the high cyclic vinyl unit content in the BR or SBR according to the invention, which has the effect of offsetting this relative shortfall in styrene unit content.

The diene elastomers obtained by the processes according to the invention may subsequently be branched (i.e. coupled or starred) or not.

Very particularly suitable starring agents are trichloromethylsilane, tetrachloromethylsilane, diphenyl carbonate or, even more preferably, tris(2,4-di-tert.-butylphenyl) phosphite, such as is described in US patent specification U.S. Pat. No. 6,384,164 in the name of the Applicants.

According to a preferred feature of the invention, said diene elastomer according to the invention is obtained by anionic polymerization of one or more monomers comprising at least one conjugated diene monomer, comprising the reaction, in an inert aliphatic or alicyclic hydrocarbon solvent, of the monomer or monomers with a catalytic system comprising an organolithium initiator and a polar agent comprising several heteroatoms, the reaction being performed:
(1) either batchwise, the (polar agent:initiator) molar ratio being in this case greater than 8,
(2) or continuously, the (polar agent:initiator) molar ratio being in this case greater than or equal to 3, which, in said case (1), makes it possible to prepare a linear diene elastomer having both a mass content of cyclic vinyl units of greater than or equal to 15% and a number-average molecular weight (Mn) ranging from 10,000 g/mol to 60,000 g/mol, and, in said case (2), makes it possible to prepare a linear diene elastomer having both a mass content of cyclic vinyl units of greater than or equal to 15% and a weight Mn ranging from 10,000 g/mol to 300,000 g/mol, it being possible to achieve Mn values of greater than or equal to 100,000 on condition that an alkali metal salt of an aliphatic or alicyclic alcohol is incorporated into said catalytic system, such that the system simultaneously satisfies the following three conditions:
(i) the (polar agent:initiator) molar ratio is greater than or equal to 3.
(ii) the (salt:initiator) molar ratio falls within a range of from 0.01 to 2, and
(iii) the (salt:polar agent) molar ratio falls within a range of from 0.001 to 0.5.

Organolithium initiators usable in this catalytic system according to the invention which may be mentioned are monolithiated compounds comprising an aliphatic or alicyclic hydrocarbon group having from 1 to 10 carbon atoms, such as n-butyllithium (hereinafter abbreviated to n-BuLi), sec-butyllithium, tert.-butyllithium, n-propyllithium, amyllithium, cyclohexyllithium or phenylethyllithium.

The quantity of initiator which is used to form the catalytic system is preferably between 0.002 and 0.01 mol per kg of monomer(s).

Polar agents comprising two or more heteroatoms (atoms of oxygen or nitrogen) usable in this catalytic system according to the invention which may be mentioned are "multidentate" polar agents, such as diethers and diamines, for example tetramethylethylenediamine (TMEDA), dimethoxyethane (DME), diethylcarbitol (DEC), triethylene glycol dimethyl ether (or "triglyme"), tetraethylene glycol dimethyl ether (or "tetraglyme"), or dipiperidinoethane.

This polar agent is used to form the catalytic system according to the invention in a content of between 300 and 30000 parts per million parts by weight of reaction medium (ppm) and, preferably, at a content of between 500 and 3000 ppm.

It will be noted that polar agents comprising a single heteroatom ("monodentate" agents), such as monoamines and monoethers, for example tetrahydrofuran (THF), are not suitable for carrying out the processes according to the invention since they do not allow the above-stated mass content of cyclic vinyl units in the diene elastomer to be obtained.

It will be noted that, unlike processes performed by means of known catalytic systems, the above-stated processes (1) or (2) according to the invention (batch or continuous) make it possible to obtain linear diene elastomers having molecular weights Mn of greater than 10,000 g/mol.

It will be noted that said process (2), which comprises anionic polymerization in a stirred continuous reactor of at least one conjugated diene monomer by the reaction, in an inert aliphatic or alicyclic hydrocarbon solvent, of the monomer or monomers with a catalytic system comprising said organolithium initiator and said polar agent comprising two or more heteroatoms, such that said relationship (i) is met, advantageously makes it possible to obtain linear elastomers with weights Mn of greater than or equal to 60,000 g/mol, or even of greater than or equal to 100,000 g/mol in the event that said salt is incorporated into the catalytic system, such that said system additionally satisfies the above-stated conditions (ii) and (iii).

This continuous process (2) according to the invention including the use of said salt is a preferred embodiment of the present invention, because it makes it possible to obtain diene elastomers having both very high molecular weights relative to the known prior art and a mass content of cyclic vinyl units of greater than or equal to 20%.

It will also be noted that the processes (1) and (2) according to the invention advantageously make it possible to control the molecular weight distribution of the diene elastomers obtained, which have a relatively low polydispersity index Ip (less than 3).

In relation to said batch process (1) according to the invention, which is characterized by a (polar agent:initiator) molar ratio value of greater than 8, this ratio is advantageously greater than or equal to 10 and, even more advantageously, greater than or equal to 15. It may, for example, be decided to restrict the value of this molar ratio to 100.

In relation to said continuous process (2) according to the invention, which is characterized by said condition (i) and optionally said conditions (ii) and (iii), the (polar agent:initiator) molar ratio is advantageously greater than or equal to 5 and, even more advantageously, this molar ratio is greater than or equal to 10. It may, for example, be decided to restrict the value of this molar ratio to 100.

Still more advantageously, in order to obtain linear diene elastomers of molecular weights Mn specifically greater than or equal to 100,000 g/mol by said continuous process (2), the catalytic systems according to the invention are such that the (polar agent:initiator) molar ratio is greater than or equal to 15, which represents very large quantities of polar agent in these catalytic systems relative to the quantities used in known catalytic systems. It may, for example, be decided to select a value of 15 to 40 for this molar ratio.

Alkali metal salts of an aliphatic or alicyclic alcohol usable in these processes which are preferably used are those, the alcohol of which comprises from 3 to 12 carbon atoms and, even more preferably, from 3 to 8 carbon atoms.

Advantageously, a sodium or potassium salt of an aliphatic alcohol is used, such as sodium tert.-butylate, sodium tert.-amylate or sodium isopentylate, or alternatively a sodium or potassium salt of an alicyclic alcohol, such as a dialkylated sodium cyclohexanolate, for example sodium mentholate.

According to one preferred feature of the invention, the catalytic system used in said continuous process (2) including said salt (characterized by said conditions (i), (ii) and (iii)) is such that the (salt:polar agent) molar ratio falls within a range of from 0.001 to 0.1.

According to another preferred feature of the invention, the catalytic system used in this continuous process (2) is such that the (salt:initiator) molar ratio falls within a range of from 0.01 to 0.6. According to a first example of embodiment of this preferred feature, this ratio falls within a range of from 0.01 to 0.2 and, according to a second example of embodiment, this ratio falls within a range of from 0.3 to 0.6.

This range of from 0.01 to 0.2 for the (salt:initiator) molar ratio is particularly suitable for obtaining, by the continuous process (2) according to the invention, linear elastomers of a molecular weight Mn of greater than or equal to 100,000 g/mol and having a mass content of cyclic vinyl units which is greater than or equal to 15%, advantageously greater than or equal to 20%.

The range of from 0.3 to 2 and, preferably, of from 0.3 to 0.6, for this (salt:initiator) molar ratio is particularly suitable for obtaining, by the continuous process (2) according to the invention, linear elastomers of a molecular weight Mn of less than or equal to 30,000 g/mol and having a mass content of cyclic vinyl units which is greater than or equal to 35%, advantageously greater than or equal to 40%.

Generally, it will furthermore be noted that the mass content of vinyl units in the diene elastomers obtained by the processes according to the invention is between 40% and 65%.

Inert hydrocarbon solvents usable in the processes according to the invention which may be mentioned are aliphatic or alicyclic solvents such as pentane, hexane, the commercial mixture of hexane/methylcyclohexane, heptane, methylcyclohexane or cyclohexane.

It will be noted that aromatic solvents, such as toluene, are not usable.

Of course, the compositions of the invention may contain a single diene elastomer comprising cyclic vinyl units such as that stated above or a mixture of several of these diene elastomers.

This or these diene elastomer(s) comprising a mass content of cyclic vinyl units greater than 15% may be used alone in the composition according to the invention, or be used in a blend with any other elastomer conventionally used in tires, such as natural rubber or a blend based on natural rubber and a synthetic elastomer, or alternatively another diene elastomer which is optionally coupled and/or starred or alternatively partially or entirely functionalised.

It will be noted that the improvement in the properties of the rubber composition according to the invention will be all the greater, the lower is the proportion of said conventional elastomer(s) in the composition according to the invention.

Advantageously, the composition according to the invention comprises said elastomer with cyclic vinyl units in a quantity of greater than or equal to 50 phr (phr: parts by weight per hundred parts of elastomer(s)) and, even more advantageously, in a quantity of greater than or equal to 70 phr (this or these conventional elastomer(s) then being present in the composition according to the invention in a quantity of less than or equal to 50 phr or alternatively of less than or equal to 30 phr, respectively).

According to a preferred embodiment of the invention, said composition comprises said elastomer with cyclic vinyl units in a quantity equal to 100 phr.

As indicated previously, the composition according to the invention also comprises a reinforcing filler in a quantity which may vary from 50 to 150 phr.

According to a first example of embodiment of the invention, said reinforcing filler comprises an inorganic reinforcing filler in a mass fraction preferably ranging from 50% to 100%.

In the present application, "inorganic reinforcing filler" is understood to mean in known manner an inorganic or mineral filler, whatever its colour and its origin (natural or synthetic), also referred to as "white" filler or sometimes "clear" filler in contrast to carbon black, this inorganic filler being capable, on its own, without any means other than an intermediate coupling agent, of reinforcing a rubber composition intended for the manufacture of tires, in other words which is capable of replacing a conventional tire-grade carbon black filler in its reinforcement function.

Advantageously, the entirety or at the very least a majority proportion of said inorganic reinforcing filler is silica ($SiO_2$). The silica used may be any reinforcing silica known to the person skilled in the art, in particular any precipitated or pyrogenic silica having a BET surface area and a CTAB specific surface area both of which are less than 450 $m^2/g$, even if highly dispersible precipitated silicas are preferred.

Preferably, a silica is used which has BET or CTAB specific surface areas which both range from 80 $m^2/g$ to 260 $m^2/g$.

In the present specification, the BET specific surface area is determined in known manner, in accordance with the method of Brunauer, Emmett and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. Non-limitative examples of such preferred highly dispersible silicas which may be mentioned are the silicas Ultrasil 7000 and Ultrasil 7005 from Degussa, the silicas Zeosil 1165 MP, 1135 MP and 1115 MP from Rhodia, the silica Hi-Sil EZ150G from PPG, the silicas Zeopol 8715, 8745 and 8755 from Huber, and treated precipitated silicas such as, for example, the aluminium-"doped" silicas described in application EP-A-735 088.

The physical state in which the inorganic reinforcing filler is present is immaterial, whether it be in the form of a powder, microbeads, granules or alternatively balls. Of course, "inorganic reinforcing filler" is also understood to mean mixtures of different inorganic reinforcing fillers, in particular of highly dispersible silicas such as described above.

Other, non-limitative examples of inorganic reinforcing fillers which may be used are:
aluminas (of formula $Al_2O_3$), such as the highly dispersible aluminas which are described in European Patent Specification EP-A-810 258, or alternatively
aluminium hydroxides, such as those described in International Patent Specification WO-A-99/28376.

Also suitable are reinforcing inorganic fillers comprising carbon blacks modified by silica, such as, although this is not limiting, the fillers sold by CABOT under the name "CRX 2000", which are described in international patent specification WO-A-96/37547.

According to a second example of embodiment of the invention, said reinforcing filler comprises carbon black in a mass fraction of from 50% to 100%. Any carbon blacks conventionally used in tires and particularly in the treads of such tires are suitable, in particular HAF, ISAF and SAF type blacks. Carbon blacks N115, N134, N234, N339, N347 and N375 may be mentioned in non-limitative manner.

Said reinforcing filler may comprise a blend of said inorganic reinforcing filler with carbon black, the mass fraction of carbon black in said reinforcing filler preferably being selected less than or equal to 50%.

For example, black/silica blends or blacks partially or entirely covered with silica are suitable to form the reinforcing filler.

The rubber composition according to the invention may furthermore comprise, in conventional manner, an inorganic reinforcing filler/elastomeric matrix bonding agent (also referred to as coupling agent), the function of which is to ensure sufficient chemical and/or physical bonding (or coupling) between said inorganic filler and the matrix, while facilitating the dispersion of this inorganic filler within said matrix.

A "coupling" agent is more precisely understood to mean an agent capable of establishing a sufficient chemical and/or physical connection between the filler under consideration and the elastomer, while facilitating the dispersion of this filler within the elastomeric matrix; such a coupling agent, which is at least difunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the elastomer, for example by means of a sulfur atom;

T represents a group making it possible to link Y and X.

The coupling agents must in particular not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, it is possible to use any known coupling agent which is known to or likely to ensure, in the diene rubber compositions usable for the manufacture of tires, effective bonding or coupling between an inorganic reinforcing filler such as silica and a diene elastomer, such as, for example, organosilanes, in particular polysulfurized alkoxysilanes or mercaptosilanes, or alternatively polyorganosiloxanes bearing the aforementioned X and Y functions.

Silica/elastomer coupling agents in particular have been described in a large number of documents, the best known being difunctional alkoxysilanes, such as polysulfurized alkoxysilanes.

In particular, polysulfurized alkoxysilanes, which are referred to as "symmetrical" or "asymmetrical" depending on their specific structure, are used, such as those described in patents U.S. Pat. Nos. 3,842,111, 3,873,489, 3,978,103, 3,997,581, 4,002,594, 4,072,701, 4,129,585, or in the more recent patents or patent applications U.S. Pat. Nos. 5,580,919, 5,583,245, 5,650,457, 4,663,358, 5,663,395, 5,663,396, 5,674,932, 5,675,014, 5,684,171, 5,684,172, 5,696,197, 5,708,053, 5,892,085, EP-A-1 043 357, which describe such known compounds in detail.

Particularly suitable for implementing the invention, without the definition below being limitative, are symmetrical polysulfurized alkoxysilanes which satisfy the following general formula (I):

  (I)

in which:
n is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, in particular propylene);
Z corresponds to one of the formulae below:

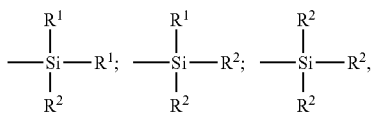

in which:
the radicals $R^1$, which may or may not be substituted, and may be identical or different, represent a $C_1$-$C_{18}$ alkyl group, a $C_5$-$C_{18}$ cycloalkyl group, or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl).
the radicals $R^2$, which may or may not be substituted, and may be identical or different, represent a $C_1$-$C_{18}$ alkoxyl group or $C_5$-$C_{18}$ cycloalkoxy group (preferably $C_1$-$C_8$ alkoxyl groups or $C_5$-$C_8$ cycloalkoxyl groups, more preferably $C_1$-$C_4$ alkoxyl groups, more particularly methoxyl and/or ethoxyl).

In the case of a mixture of polysulfurized alkoxysilanes corresponding to the formula (I) above, in particular conventional commercially available mixtures, it will be understood that the mean value of "n" is a fractional number, preferably varying between 2 and 5.

Polysulfurized alkoxysilanes which may more particularly be mentioned are polysulfides (in particular disulfides, trisulfides or tetrasulfides) of bis(alkoxyl($C_1$-$C_4$)-alkyl($C_1$-$C_4$)silylalkyl($C_1$-$C_4$)), such as for example bis(3-trimethoxysilylpropyl) or bis(3-triethoxysilylpropyl) polysulfides. Of these compounds, bis(3-triethoxysilylpropyl) tetrasulfide, abbreviated TESPT, of the formula $[(C_2H_5O)_3Si(CH_2)_3S_2]_2$, or bis(triethoxysilylpropyl) disulfide, abbreviated TESPD, of the formula $[(C_2H_5O)_3Si(CH_2)_3S]_2$ are in particular used. TESPD is sold, for example, by Degussa under the names Si266 or Si75 (in the latter case, in the form of a mixture of disulfide (75% by weight) and of polysulfides), or alternatively by Witco under the name Silquest A1589. TESPT is sold, for example, by Degussa under the name Si69 (or X50S when supported at a content of 50 wt. % on carbon black) or alternatively by the company Osi Specialties under the name Silquest A1289 (in both cases, a commercial mixture of polysulfides with an average value of n approaching 4). Tetrasulfurised monoalkoxysilanes, such as monoethoxydimethylsilylpropyl tetrasulfide (abbreviated to MESPT), which are the subject matter of international patent application PCT/EP02/03774 in the name of the applicants, may also be mentioned.

The compositions according to the invention also comprise, in addition to said elastomeric matrix, said reinforcing filler and optionally said bonding agent, all or part of the other constituents and additives normally used in rubber compositions, such as plasticisers, pigments, antioxidants, antiozonant waxes, a crosslinking system based on sulfur and/or peroxide and/or bismaleimides, one or more covering agents for the inorganic reinforcing filler such as alkylalkoxysilanes, polyols, amines or amides.

The compositions according to the invention may be prepared by carrying out a first thermomechanical working phase of the constituents of the composition, with the exception of the crosslinking system and at a maximum temperature of between 130° C. and 200° C., followed by a second mechanical working phase carried out at a temperature below said maximum temperature of the first phase and during which said crosslinking system is incorporated.

The above-stated, and further, features of the present invention are disclosed in greater detail in the following description of several exemplary embodiments of the invention, which are stated by way of illustrative, non-limiting examples.

Characterization of the Synthesised Elastomers:
SEC (size exclusion chromatography) was used to determine the molecular weights and the polydispersity indices of the elastomers. According to this technique, the macromolecules are separated physically according to their respective sizes when swollen, in columns filled with a porous stationary phase.

A chromatograph sold under the name "WATERS" and under the model "150C" is used for the aforementioned separation. A set of two "WATERS" columns is used, the type being "STYRAGEL HT6E".

DSC (differential scanning calorimetry) was used to measure the glass transition temperatures (Tg) of the elastomers obtained.

Furthermore, carbon-13 nuclear magnetic resonance ($^{13}$C-NMR) was used to determine the microstructural characteristics of the elastomers obtained. The details of this characterization are explained below.

$^{13}$C-NMR analyses are performed using a "Bruker AM250" spectrometer. The nominal frequency of carbon 13 is 62.9 MHz. To ensure quantitative results, the spectra are recorded without the "nuclear Overhauser effect" (NOE). Spectral width is 240 ppm. The impulse angle used is a 90° impulse with a duration of 5 μs. Low power decoupling and a wide proton band are used to eliminate scalar $^1$H-$^{13}$C coupling during $^{13}$C acquisition. The sequence repetition time is 4 seconds. The number of transients accumulated to increase the signal/noise ratio is 8192. The spectra are calibrated against the CDCl$_3$ band at 77 ppm.

Interpretation of the NMR spectra of SBR and BR has been the subject matter of many publications in the literature, for example the following documents:
(1) Q.-T. Pham, R. Pétiaud, H. Waton, M.-F. Llauro-Darricades, Proton and Carbon NMR Spectra of Polymers, Penton Press, London (1991).
(2) Sato H., Ishikawa, T., Takebayashi K., Tanaka Y., Macromolecules, 22, 1748-1753, (1989).
(3) Harwood, H., J. Rubber Chem. Technology, 55, 769-806, (1982).
(4) Kobayashi E., Furakawa J., Ochiai M., Tsujimoto T, European Polym. J., 19, 871-875, (1983).

(5) Jiao S., Chen X., Hu L., Yan B., Chinese J. Polym. Sci., 8, 17-24, (1990).
(6) Quack G., Fetters L. J., Macromolecules, 11, no. 2, 369-373, (1978).

In particular, vinylcyclopentane type structures were revealed and assigned in document (6) above.

The microstructures revealed for SBR and BR are as follows:

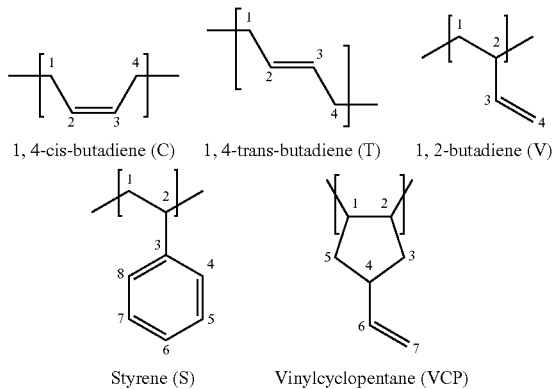

1, 4-cis-butadiene (C)   1, 4-trans-butadiene (T)   1, 2-butadiene (V)

Styrene (S)   Vinylcyclopentane (VCP)

The table below summarises the chemical shifts corresponding to the various carbon atoms of these structures in the unsaturated carbon zone.

| Chemical shifts | Assignments Structure - No. of carbon observed |
| --- | --- |
| 145-140.6 | V-3, VCP-6 |
| 116.6-113.2 | V-4 |
| 126.5-124.9 | S-6 |
| 132.9-126.9 | S-4, S-5, S-7, S-8 |
|  | C-2, C-3, T-2, T-3 |
| 145-140.6 | V-3, VCP-6 |
| 147.1-145 | S-3 |
| 113.2-111 | VCP-7 |

The cis/trans ratio in the diene moiety is determined in the aliphatic portion of the spectrum on the basis of assignments which are familiar to the person skilled in the art (see documents (1) to (5) above).

Characterization of the Rubber Compositions Obtained:
Mooney viscosity: ML(1+4) at 100° C. measured in accordance with Standard ASTM D 1646.
Moduli of elongation ME10, ME100 and ME300 (at 10%, 100% and 300%, expressed in MPa) measured in accordance with Standard ASTM D 412.
SHORE A hardness: measured in accordance with Standard ASTM D 2240, 1997.
Hysteresis losses (HL): measured in % by rebound at 60° C. on sixth impact, according to relationship HL (%)=100×($W_0$-$W_1$)/$W_1$, where $W_0$=energy supplied and $W_1$=energy returned.
Dynamic shear properties: measured in accordance with Standard ASTM D 2231-71, approved in 1977 (measurement as a function of the deformation performed at 10 Hz with a peak-to-peak deformation ranging from 0.45 to 50%). The stated nonlinearity is the difference in the shear moduli (MPa) between 0.15 and 50% deformation. Hysteresis is stated by measurement of tan δ at 7% deformation and at 23° C. in accordance with Standard ASTM D 2231-71.
Dynamic properties in compression: measurements as a function of temperature performed at 10 Hz while the temperature is rising (at a rate of 2° C. per minute) with an applied stress of 12 N and a ratio of dynamic force to static force of 1.25.

I. ELASTOMER SYNTHESIS EXAMPLES

1) Example 1

"Control": Preparation of a High Molecular Weight, Oil-Extended "Control" Starred SBR 1 Containing No Vinylcyclopentane Structural Units This SBR is produced continuously in a 14 liter perfectly stirred reactor.

Toluene, butadiene, styrene, tetrahydrofuran and dimethoxyethane are introduced into this reactor in quantities by weight of 100:10.15:4.15:0.68:0.25 respectively. 200 µmol of n-BuLi per 100 g of monomers are introduced via the line inlet in order to neutralise the protic impurities introduced by the various constituents present in this line inlet. 150 µmol of n-BuLi per 100 g of monomers are introduced at the reactor inlet.

The (polar agent:n-BuLi) molar ratio is approximately 569.

The various flow rates are adjusted such that the average dwell time in the reactor is 40 minutes and the temperature is maintained at 60° C.

The conversion rate, which is measured on a sample taken at the reactor outlet, is 87%, and the inherent viscosity of the linear SBR obtained, which is measured at 0.1 g/dl in toluene, is 2.61 dl/g. A starring agent consisting of propylene glycol carbonate is introduced at the reactor outlet, then this starred SBR is subjected to antioxidant treatment with 0.2 phr of 2,2'-methylene-bis(4-methyl-6-tert.-butylphenol) and 0.2 phr of N-(1,3-dimethylbutyl)-N'-phenyl-p-phenylenediamine.

The mass Mn of this starred SBR 1 is 250,000 g/mol, and the Ip index is 1.89.

This "control" SBR 1 has a mass content of styrene linkages of 25%. As for the butadiene moiety, it has a mass content of vinyl structural units of 58% and no vinylcyclopentane structural unit is detected.

Prior to extension with oil, the Tg of this "control" SBR 1 according to the invention is −24° C.

This Example clearly shows that an aromatic polymerization solvent, such as toluene, is not suitable for obtaining cyclic vinyl units in the high molecular weight diene elastomer obtained.

This "control" SBR 1 is then extended according to techniques known to the person skilled in the art with 37 parts by weight of aromatic oil per 100 parts of elastomer.

2) Example 2

According to the Invention: Preparation of a High Molecular Weight, Oil-Extended Starred SBR 2 According to the Invention This SBR is produced continuously in a 14 liter perfectly stirred reactor.

Cyclohexane, butadiene, styrene and tetramethylethylenediamine are introduced into this reactor in quantities by weight of 100:13.6:0.7:0.17 respectively (the quantity of tetramethylethylenediamine in the reaction medium being approximately 1500 ppm), and a solution of sodium tert.-amylate is furthermore introduced in a sodium:active lithium ratio of 0.04. 300 μmol of n-BuLi per 100 g of monomers are introduced via the line inlet in order to neutralise the protic impurities introduced by the various constituents present in the line inlet. 660 μmol of n-BuLi per 100 g of monomers are introduced at the reactor inlet. The (TMEDA:n-BuLi) molar ratio is approximately 15.5.

The various flow rates are adjusted such that the average dwell time in the reactor is 40 minutes and the temperature is maintained at 80° C.

The (sodium:tetramethylethylenediamine) molar ratio is 0.002.

The conversion rate, which is measured on a sample taken at the reactor outlet, is 90%, and the inherent viscosity of the linear SBR obtained, which is measured at 0.1 g/dl in toluene, is 2.30 dl/g. This linear SBR has a number-average molecular weight $M_n$ of 150,000 g/mol.

A starring agent comprising tris(2,4-di-tert-butylphenyl) phosphite is introduced at the reactor outlet, then this starred SBR is subjected to the antioxidant treatment of section 1) above. This starred SBR 2 has a weight $M_n$ of 260,000 g/mol and an Ip index of 2.56.

The mass content of styrene linkages in this starred SBR 2 according to the invention is 6%. In the butadiene moiety, the mass content of vinyl linkages is 57% and the mass content of vinylcyclopentane units is 22%.

Prior to extension with oil, the Tg of this SBR 2 according to the invention is −25° C.

By incorporating an alkali metal salt of an aliphatic or alicyclic alcohol into the catalytic system, polymerization (carried out continuously with a (polar agent:initiator) molar ratio of greater than 15) thus gives rise to a mass content of cyclic vinyl units of greater than 20% for a linear elastomer of a molecular weight of greater than 150,000 g/mol.

This starred SBR 2 according to the invention is then extended according to techniques known to the person skilled in the art with 37 parts by weight of aromatic oil per 100 parts of elastomer.

3) Example 3

According to the Invention: Preparation of a High Molecular Weight, Oil-Extended Starred BR According to the Invention This polybutadiene (BR) according to the invention is produced continuously under conditions identical to those described in Example 2 above, except that 14.3 parts per hundred parts of cyclohexane are introduced into the reactor, that no styrene is introduced into the reactor and that 600 μmol of n-BuLi per 100 g of monomers are introduced at the reactor inlet.

The (TMEDA:n-BuLi) molar ratio is approximately 17.1.

The conversion rate, which is measured on a sample taken at the reactor outlet, is 92%, and the inherent viscosity of the linear BR obtained, which is measured at 0.1 g/dl in toluene, is 1.86 dl/g. The molecular weight $M_n$ of this linear BR is 130,000 g/mol.

As previously, the starring agent is introduced at the reactor outlet before the starred BR is subjected to the same antioxidant treatment as above.

This starred BR has a weight $M_n$ of 181,000 g/mol and an Ip index of 2.89.

This starred BR has a mass content of vinyl linkages of 56% and a mass content of vinylcyclopentane units of 20%.

Prior to extension with oil, the Tg of this BR according to the invention is −29° C.

This Example also shows that, by incorporating an alkali metal salt of an aliphatic or alicyclic alcohol into the catalytic system, polymerization (carried out continuously with a (polar agent:initiator) molar ratio of greater than 15) gives rise to a mass content of cyclic vinyl units of greater than 20% with a linear polybutadiene of a molecular weight of greater than 100,000 g/mol.

This starred BR according to the invention is extended according to techniques known to the person skilled in the art with 35 parts by weight of aromatic oil per 100 parts of elastomer.

4) Example 4

According to the Invention: Preparation of a High Molecular Weight, Non-Oil-Extended Starred SBR 4 According to the Invention The polymer is produced continuously in a 0.8 liter perfectly stirred reactor.

Cyclohexane, butadiene, styrene, tetramethylethylenediamine are introduced into this reactor in quantities by weight of 100:13.15:1.13:0.29 respectively. 200 mmol of n-BuLi per 100 g of monomers are introduced via the line inlet in order to neutralise the protic impurities introduced by the various constituents present in this line inlet. 1200 μmol of n-BuLi per 100 g of monomers are introduced at the reactor inlet.

The (TMEDA:n-BuLi) molar ratio is approximately 14.6.

The various flow rates are adjusted such that the average dwell time in the reactor is 40 minutes and the temperature is maintained at 80° C.

The conversion rate, which is measured on a sample taken at the reactor outlet, is 92%, and the inherent viscosity of the linear SBR obtained, which is measured at 0.1 g/dl in toluene, is 1.35 dl/g. The molecular weight $M_n$ of this linear SBR is 75,000 g/mol.

A starring agent comprising methyltrichlorosilane (400 μmol per 100 g de monomers) is introduced at the reactor outlet, then this starred SBR is subjected to the same antioxidant treatment as previously.

The mass $M_n$ of this starred SBR 4 is 120,000 g/mol, and the Ip index is 1.89. The viscosity of this SBR 4 is 1.85 dl/g.

This SBR 4 has a content of styrene units of 8%, a mass content of vinyl structural units of 51% and a mass content of vinylcyclopentane structural units of 18%.

The Tg of this SBR 4 according to the invention is −28° C.

This Example shows that it is not necessary to incorporate an alkali metal salt of an aliphatic or alicyclic alcohol into the catalytic system in order to obtain, after polymerization (carried out continuously with a (polar agent:initiator) molar ratio of greater than 10), a mass content of cyclic vinyl units of greater than 15% for a linear elastomer of a molecular weight $M_n$ of between 50,000 and 100,000 g/mol.

5) Example 5

"Control": Preparation of a High Molecular Weight, Non-Oil-Extended "Control" Starred SBR 5

The SBR is prepared under conditions similar to those of Example 4.

Cyclohexane, butadiene, styrene, tetramethylethylenediamine are introduced into this reactor in quantities by weight of 100:10.6:3.7:0.02 respectively. 200 μmol of n-BuLi per 100 g of monomers are introduced via the line inlet in order to neutralise the protic impurities introduced by the various constituents present in this line inlet. 1200 μmol of n-BuLi per 100 g of monomers are introduced at the reactor inlet.

The various flow rates are adjusted such that the average dwell time in the reactor is 40 minutes and the temperature is maintained at 60° C.

The conversion rate, which is measured on a sample taken at the reactor outlet, is 92%, and the inherent viscosity of the SBR obtained, which is measured at 0.1 g/dl in toluene, is 1.20 dl/g. A starring agent comprising methyltrichlorosilane (400 μmol per 100 g de monomers) is introduced at the reactor outlet, then this starred SBR 5 is subjected to the same antioxidant treatment as previously.

The mass Mn of this starred SBR 5 is 110,000 g/mol, and the Ip index is 1.51. The viscosity of this SBR 5 is 1.56 dl/g.

This starred SBR 5 has a mass content of vinyl units of 52% and a mass content of vinylcyclopentane units of 2.5%.

The content of styrene units in this SBR 5 is 25%.

The Tg of this SBR 5 is −28° C.

II. Rubber Processing Examples

1) FIRST COMPARATIVE EXAMPLE

In this Example, two rubber compositions 1 and 2 of the passenger-car tire tread type, the reinforcing filler of which consists of silica, are compared.

The first "control" composition 1 is based on the "control" SBR 1 obtained in Example 1 of section I. above (this SBR 1 in particular has a mass content of styrene linkages of 25%, and contains no cyclic vinyl structural units).

The second composition 2 according to the invention is based on the SBR 2 according to the invention obtained in Example 2 of section I. above (this SBR 2 has a mass content of styrene linkages of 6% and a mass content of cyclic vinyl structural units of 22%).

The formulation of each of the compositions 1 and 2 is as follows
(in phr: parts by weight per hundred parts of elastomer):

| | |
|---|---|
| Elastomer: SBR 1 or SBR 2 | 100 |
| Silica (1) | 80 |
| Aromatic oil "ENERFLEX 65" | 37.5 |
| Bonding agent (2) | 6.4 |
| ZnO | 2.5 |
| Stearic acid | 2 |
| Antioxidant (3) | 1.9 |
| Antiozone wax "C32ST" | 1.5 |
| Sulfur | 1.1 |
| Sulfenamide (4) | 2 |
| Diphenylguanidine | 1.47 |

(1) = Silica "ZEOSIL 1165 MP" (sold by Rhodia)
(2) = Bonding agent "Si69" (sold by Degussa)
(3) = N-(1,3-dimethylbutyl)-N'-phenyl-p-phenylenediamine
(4) = N-cyclohexyl-2-benzothiazylsulfenamide Each composition is prepared according to the method described in European Patent specification EP-A-501 227, it being specified that a first thermomechanical working phase is performed in two steps respectively lasting 4 and 5 minutes, at an average paddle speed of 85 revolutions/minute in a mixer of approximately 400 cm$^3$ until a maximum "dropping" temperature of 160° C. is reached, and a second mechanical working phase, which includes incorporation of the vulcanization system, is performed on an open mill at 30° C.

Vulcanization is carried out at 150° C. for 60 minutes.
The results are set forth in Table 1.

TABLE 1

| COMPOSITION | 1 ("control") | 2 (invention) |
|---|---|---|
| ML(1 + 4) at 100° C."rubber" | 67 | 55 |
| Properties in the non-vulcanized state: | | |
| ML(1 + 4) at 100° C."mixture" | 97 | 82 |
| Properties in the vulcanized state: | | |
| Shore | 65 | 65 |
| ME10 | 5.6 | 5.8 |
| ME100 | 1.8 | 1.9 |
| ME300 | 2.3 | 2.5 |
| ME300/ME100 | 1.3 | 1.3 |
| Losses at 60° C. | 24.3 | 27.3 |
| Dynamic properties as a function of deformation | | |
| Delta G* at 23° C. | 3.11 | 3.54 |
| Tan δ max. at 23° C. | 0.347 | 0.415 |
| Dynamic properties as a function of temperature | | |
| Dynamic Tg (° C.) | −16 | −11 |
| Tan δ at Tg | 0.75 | 0.77 |

With regard to the properties in the vulcanized state, it will be noted that the properties of composition 2 according to the invention are of the same order of magnitude as those of the "control" composition 1.

In fact, the moduli at low and high deformations and the hysteresis properties at low and high deformations (tan δ max. at 23° C. and losses at 60° C., respectively) of composition 2 are close to the corresponding moduli and hysteresis properties of composition 1. The differences in hysteresis properties observed at small (ΔG*) and large (losses at 60° C.) deformations between compositions 1 and 2 are mainly due to the difference in dynamic Tg between these compositions. Had the dynamic Tg been identical, these properties would have been similar.

Furthermore, composition 2 according to the invention has a "mixture" Mooney viscosity value which is 15 points lower than that of the "control" composition 1.

It will also be noted that SBR 2 according to the invention, which has a mass content of styrene linkages of only 6%, makes it possible to impart to composition 2 according to the invention practically the same properties in the vulcanized state as those imparted to the "control" composition 1 by SBR 1, which has a mass content of styrene linkages of 25%, thanks to the high content (22%) of cyclic vinyl structural units which this SBR 2 comprises, unlike SBR 1 which contains no such structural units.

2) SECOND COMPARATIVE EXAMPLE

In this Example, two rubber compositions 1 and 3 of the passenger-car tire tread type, the reinforcing filler of which consists of silica, are compared.

The first "control" composition 1 is identical to that in section II. 1) above.

The second composition 3 according to the invention is based on the BR according to the invention obtained in Example 3 of section I. above (this BR has a mass content of cyclic vinyl structural units of 20%).

The formulation of each of the compositions 1 and 3 is as follows
(in phr: parts by weight per hundred parts of elastomer):

| | |
|---|---|
| Elastomer: SBR 1 or BR | 100 |
| Silica (1) | 80 |
| Aromatic oil "ENERFLEX 65" | 37.5 |
| Bonding agent (2) | 6.4 |
| ZnO | 2.5 |
| Stearic acid | 2 |
| Antioxidant (3) | 1.9 |
| Antiozone wax "C32ST" | 1.5 |
| Sulfur | 1.1 |
| Sulfenamide (4) | 2 |
| Diphenylguanidine | 1.47 |

(1) = Silica "ZEOSIL 1165 MP" (sold by Rhodia)
(2) = Bonding agent "Si69" (sold by Degussa)
(3) = N-(1,3-dimethylbutyl)-N'-phenyl-p-phenylenediamine
(4) = N-cyclohexyl-2-benzothiazylsulfenamide Each composition is prepared according to the method described in European Patent specification EP-A-501 227, it being specified that a first thermomechanical working phase is performed in two steps respectively lasting 4 and 5 minutes, at an average paddle speed of 85 revolutions/minute in a mixer of approximately 400 cm$^3$ until a maximum "dropping" temperature of 160° C. is reached, and a second mechanical working phase, which includes incorporation of the vulcanization system, is performed on an open mill at 30° C.

Vulcanization is carried out at 150° C. for 60 minutes.

The results are set forth in Table 2.

TABLE 2

| COMPOSITION | 1 ("control") | 3 (invention) |
|---|---|---|
| ML(1 + 4) at 100° C."rubber" | 67 | 48 |
| Properties in the non-vulcanized state: | | |
| ML(1 + 4) at 100° C."mixture" | 97 | 71 |
| Properties in the vulcanized state: | | |
| Shore | 65 | 65 |
| ME10 | 5.6 | 5.8 |
| ME100 | 1.8 | 1.9 |
| ME300 | 2.3 | 2.5 |
| ME300/ME100 | 1.3 | 1.3 |
| Losses at 60° C. | 24.3 | 27.0 |
| Dynamic properties as a function of deformation | | |
| Delta G* at 23° C. | 3.11 | 3.59 |
| Tan δ max. at 23° C. | 0.347 | 0.405 |
| Dynamic properties as a function of temperature | | |
| Dynamic Tg (° C.) | −16 | −13 |
| Tan δ at Tg | 0.75 | 0.72 |

With regard to the properties in the vulcanized state, it will be noted that the properties of composition 3 according to the invention are of the same order of magnitude as those of the "control" composition 1.

In fact, the moduli at low and high deformations and the hysteresis properties at low and high deformations (tan δ max. at 23° C. and losses at 60° C., respectively) of composition 3 are close to the corresponding moduli and hysteresis properties of composition 1. The differences in hysteresis properties observed at small (ΔG*) and large (losses at 60° C.) deformations between compositions 1 and 3 are mainly due to the difference in dynamic Tg and "rubber" Mooney values between these compositions. Had the dynamic Tg and "rubber" Mooney values been identical, these properties would have been similar.

It will also be noted that the dynamic Tg of composition 3 according to the invention is very close to that of the "control" composition 1.

Furthermore, composition 3 according to the invention has a "mixture" Mooney viscosity value which is 26 points lower than that of the "control" composition 1.

It will furthermore be noted that the BR according to the invention, which by definition contains no styrene linkages, makes it possible to impart to the composition 3 according to the invention practically the same properties in the vulcanized state as those imparted to the "control" composition 1 by SBR 1, which has a mass content of styrene linkages of 25%, thanks to the high content (20%) of cyclic vinyl structural units which this BR comprises, unlike SBR 1 which contains no such structural units.

3) THIRD COMPARATIVE EXAMPLE

In this Example, two rubber compositions 4 and 5 of the passenger-car tire tread type, the reinforcing filler of which consists of silica, are compared.

The second composition 4 according to the invention is based on the SBR 4 according to the invention obtained in Example 4 of section I. above (this SBR 4 has a mass content of styrene linkages of 8% and a mass content of cyclic vinyl structural units of 18%).

The second composition 5 according to the invention is based on the SBR 5 according to the invention obtained in Example 5 of section I. above (this SBR 5 has a mass content of styrene linkages of 25% and a mass content of cyclic vinyl structural units of only 2.5%).

The formulation of each of the compositions 4 and 5 is as follows (in phr: parts by weight per hundred parts of elastomer):

| | |
|---|---|
| Elastomer: SBR 4 or SBR 5 | 100 |
| Silica (1) | 60 |
| Aromatic oil "ENERFLEX 65" | 20.5 |
| Bonding agent (2) | 4.8 |
| ZnO | 2.5 |
| Stearic acid | 2 |
| Antioxidant (3) | 1.9 |
| Antiozone wax "C32ST" | 1.5 |
| Sulfur | 1.1 |
| Sulfenamide (4) | 2 |
| Diphenylguanidine | 1.1 |

(1) = Silica "ZEOSIL 1165 MP" (sold by Rhodia)
(2) = Bonding agent "Si69" (sold by Degussa)
(3) = N-(1,3-dimethylbutyl)-N'-phenyl-p-phenylenediamine
(4) = N-cyclohexyl-2-benzothiazylsulfenamide Each composition is prepared according to the method described in European Patent specification EP-A-501 227, it being specified that a first thermomechanical working phase is performed in two steps respectively lasting 4 and 5 minutes, at an average paddle speed of 85 revolutions/minute in a mixer of approximately 400 cm$^3$ until a maximum "dropping" temperature of 160° C. is reached, and a second mechanical working phase, which includes incorporation of the vulcanization system, is performed on an open mill at 30° C.

Vulcanization is carried out at 150° C. for 60 minutes.

The results are set forth in Table 3.

TABLE 3

| COMPOSITION | 4 (invention) | 5 ("control") |
|---|---|---|
| ML(1 + 4) at 100° C."rubber" | 43 | 43 |
| Properties in the non-vulcanized state: | | |
| ML(1 + 4) at 100° C. "mixture" | 61 | 55 |
| Properties in the vulcanized state: | | |
| Shore | 59.3 | 59.1 |
| ME10 | 4.8 | 4.5 |
| ME100 | 1.5 | 1.4 |
| ME300 | 1.5 | 1.5 |
| ME300/ME100 | 1.0 | 1.08 |
| Losses at 60° C. | 35.0 | 35.1 |
| Dynamic properties as a function of deformation | | |
| Delta G* at 23° C. | 1.45 | 1.15 |
| Tan δ max. at 23° C. | 0.257 | 0.238 |
| Dynamic properties as a function of temperature | | |
| Dynamic Tg (° C.) | −15 | −15 |
| Tan δ at Tg | 1.11 | 1.19 |
| E' at 50° C. in MPa | 5.5 | 5.7 |
| E" at 50° C. in MPa | 0.83 | 0.86 |

With regard to the properties in the vulcanized state, it will be noted that the properties of composition 4 according to the invention are similar to those of the "control" composition 5.

In fact, the moduli at low and high deformations and the hysteresis properties at low and high deformations (tan δ max. at 23° C. and losses at 60° C., respectively) of composition 4 are close to the corresponding moduli and hysteresis properties of composition 5.

It will also be noted that the dynamic properties (dynamic Tg, in particular) of composition 4 according to the invention are very close to those of the "control" composition 5.

Consequently, at identical dynamic Tg and "rubber" Mooney values, the hysteresis properties observed at small (ΔG*) and large (losses at 60° C.) deformations are similar for compositions 4 and 5.

It will also be noted that SBR 4 according to the invention, which has a mass content of styrene linkages of only 8%, makes it possible to impart to composition 4 according to the invention practically the same properties in the vulcanized state as those imparted to the "control" composition 5 by SBR 5, which has a mass content of styrene linkages of 25%, thanks to the high content (18%) of cyclic vinyl structural units which this SBR 4 comprises, unlike SBR 5 which contains only 2.5% of such structural units.

The invention claimed is:

1. A tire tread which comprises a crosslinkable or crosslinked rubber composition comprising a linear or branched diene elastomer resulting from at least one conjugated diene, and a reinforcing filler, wherein said elastomer comprises cyclic vinyl units according to a mass content of greater than or equal to 15% and has a number-average molecular weight ranging from 30,000 to 350,000 g/mol and a polydispersity index of less than 3.

2. The tire tread according to claim 1, which consists of said rubber composition.

3. A tire which comprises a tread according to claim 1.

4. The tire tread according to claim 1, wherein said number-average molecular weight falls within a range of from 60,000 to 350,000 g/mol.

5. The tire tread according to claim 1, wherein said number-average molecular weight falls within a range of from 100,000 to 300,000 g/mol.

6. The tire tread according to claim 1, wherein said mass content of cyclic vinyl units is greater than or equal to 20%.

7. The tire tread according to claim 1, wherein said elastomer comprises a mass fraction of units resulting from conjugated dienes of greater than 30%.

8. The tire tread according to claim 1, wherein said elastomer is a 1,3-butadiene homopolymer or a copolymer of 1,3-butadiene and a vinyl aromatic comonomer.

9. The tire tread according to claim 1, wherein said elastomer is present in a quantity of greater than or equal to 50 parts by weight per hundred parts of elastomer(s).

10. The tire tread according to claim 1, wherein said elastomer is present in a quantity equal to 100 phr.

11. The tire tread according to claim 1, wherein said reinforcing filler comprises an inorganic reinforcing filler.

12. The tire tread according to claim 1, wherein the mass fraction of said inorganic reinforcing filler is greater than or equal to 50%.

13. The tire tread according to claim 1, wherein the mass fraction of said inorganic reinforcing filler is equal to 100%.

14. The tire tread according to claim 1, wherein the inorganic reinforcing filler is silica.

15. The tire tread according to claim 1, wherein said elastomer is branched by means of a starring agent.

16. The tire tread according to claim 1, where the starring agent is tris (2,4-di-tert.-butylphenyl) phosphate.

* * * * *